United States Patent [19]

Kaylo et al.

[11] 4,421,620

[45] Dec. 20, 1983

[54] PROCESS FOR PRETREATING AND COATING METALLIC SUBSTRATES ELECTROPHORETICALLY

[75] Inventors: Alan J. Kaylo, Glenshaw; Nicholas T. Castellucci, Pittsburgh, both of Pa.

[73] Assignee: PPG Industries, Inc., Pittsburgh, Pa.

[21] Appl. No.: 347,844

[22] Filed: Feb. 11, 1982

[51] Int. Cl.$^3$ .................. C25D 13/06; C25D 13/08; C25D 13/20

[52] U.S. Cl. .................. 204/181 C; 204/181 R; 204/181 T

[58] Field of Search .......... 204/181 C, 181 T, 181 R

[56] References Cited

U.S. PATENT DOCUMENTS

| | | | |
|---|---|---|---|
| 2,782,241 | 2/1957 | Gray et al. | 260/619 |
| 3,954,588 | 5/1976 | Hazan et al. | 204/181 C |
| 4,039,353 | 8/1977 | Kulick et al. | 148/6.15 R |
| 4,054,466 | 10/1977 | King et al. | 148/6.27 |
| 4,086,182 | 4/1978 | Hengelhaupt et al. | 252/182 |
| 4,105,840 | 8/1978 | Cohen | 526/62 |
| 4,111,722 | 9/1978 | Reghi et al. | 148/6.15 R |
| 4,213,839 | 7/1980 | Azzerri et al. | 204/181 R |

FOREIGN PATENT DOCUMENTS 1200340 7/1970 United Kingdom.

OTHER PUBLICATIONS

"Anticorrosive Properties of Mimosa (Wattle) Tannin," by A. J. Seavell, J. Oil Col. Chem. Assoc., 1978, 61, pp. 439–462.

Troy Chemical Corp. product literature entitled AC-TAN$^{SP}$® Rust Converter.

General Electric product literature entitled METHYLON® Resins.

*Primary Examiner*—Howard S. Williams
*Attorney, Agent, or Firm*—Godfried R. Akorli

[57] ABSTRACT

An electrophoretic process for preparing corrosion-resistant substrates is disclosed. The process comprises sequential electrophoretic steps of anodic electrophoresis, followed by cathodic electrophoresis. The electrophoretic composition comprising an aqueous dispersion of a reaction product of a tannin, an epoxy material and a cationic water-solubilizing salt group is employed.

10 Claims, No Drawings

NOVEL PROCESS FOR PRETREATING AND COATING METALLIC SUBSTRATES ELECTROPHORETICALLY

BACKGROUND OF THE INVENTION

1. Field of the Invention:

The present invention relates to a process for treating metallic substrates so as to make them corrosion resistant. The invention also relates to metallic substrates which are prepared by this process.

2. Brief Description of the Prior Art:

It is known in the art to prepare corrosion-resistant substrates by applying thereto compositions comprising certain metallic ions. Eminent in the art are phosphatizing treating compositions. Examples of the phosphatizing treating compositions are those containing iron phosphate, zinc phosphate or zinc calcium phosphate.

Although the metallic treating compositions are, largely, employed on many industrial lines, they, nonetheless, have certain shortcomings. They are expensive; besides the cost of the chemicals, a considerable capital investment is required for equipment. Also, the process for using these treating compositions results in pollution, the cleaning of which adds to the overall cost of operations.

Co-filed application Ser. No. 347,845 describes novel compositions of tannin-epoxy reaction products which provide relatively inexpensive yet highly effective means of producing corrosion-resistant substrates. This invention provides an improved process for pretreating substrates, electrophoretically, with an improved corrosion resistance benefit inurring to the treated substrates.

SUMMARY OF THE INVENTION

The present invention encompasses a process for preparing a corrosion-resistant metallic substrate; said process comprises steps of:

(i) passing an electric current between the substrate, acting as an anode, and a cathode, in contact with an electrophoretic composition; followed by (ii) passing an electric current between the substrate, acting as a cathode, and an anode, in contact with the electrophoretic composition;

the electrophoretic composition comprises an aqueous dispersion of a composition of matter containing a cationic salt and a reaction product of:

(a) an epoxy material;
(b) a tannin.

In a preferred embodiment wherein the epoxy material is a polyepoxide, the tannin is reacted in an amount ranging from about 0.5 to 4.4 percent by weight, based on the total weight of the tannin and the polyepoxide.

Metallic substrates, particularly ferrous metal substrates which are prepared by this process, are also encompassed by the invention.

DETAILED DESCRIPTION

In the process of this invention, the substrate to be treated is immersed in an electrophoretic cell. To effect passage of electric current, in accordance with the process steps, an electric potential is applied across the electrodes. The applied potential is determined by factors such as the nature of the electrophoretic composition, as to its conductivity, its temperature, the alloted time for passage of current, and other factors such as electrode spacing. In the practice of this invention, the applied potential is such as provides effective pretreatment of the substrates. It would be realized that the specific combinations and permutations of the factors that determine the applied potential would be determined by testing.

The current density of the electrophoretic process is typically below 0.1 ampere per square inch of electrode surface over a period of time of 5 to 30 seconds.

The process of this invention can be utilized to pretreat and thus provide improved corrosion resistance to metal surfaces such as iron, steel, aluminum, zinc, and the like. One advantage of the novel process is that the same electrophoretic composition can be employed in the two process steps. At the end of the first process step, one only needs to reverse polarity of the electrodes, in order to carry out the second process step.

Alternately, two electrophoretic baths can be used: the first process step is conducted in one bath. At the end of the process step, the substrate is removed from the bath and then immersed into the second bath comprising the same electrodepositable composition. The polarity of the electrodes of the second bath, in accordance with the invention, is the reverse of the polarity of the electrodes of the first bath.

The electrophoretic composition comprises an aqueous dispersion of a novel composition containing a cationic salt and a reaction product of an epoxy material and a tannin in an amount ranging from about 0.5 to 4.4 percent by weight based on the total weight of the epoxy material and the tannin.

The epoxy material may be of a resin class containing at least one 1,2-epoxy group. The resin may be, for example, among the general classes commonly referred to as polyethers, polyesters, acrylic, urethane, and the like, which contain the 1,2-epoxy group. Although monoepoxides such as phenyl glycidyl ether, n-butyl glycidyl ether and the like can be utilized, it is preferred that the epoxy material contain more than one 1,2-epoxy group per molecule, as such, it is polyepoxide. Examples of suitable polyepoxides are described in U.S. Pat. Nos. 2,467,171; 2,615,007; 2,716,123; 3,030,336; 3,053,855 and 3,075,999.

Particularly preferred polyepoxides are polyglycidyl ethers of cyclic polyols, particularly polyphenols such as bisphenol A. These polyepoxides may be produced by etherification of a cyclic polyol with epichlorohydrin or dichlorohydrin in the presence of alkali. Examples of cyclic polyols are bis(4-hydroxyphenyl)-2,2-propane, 4,4'-dihydroxybenzophenone, bis(4-hydroxyphenyl)-1,1-isobutane, bis(4-hydroxytertiarybutylphenyl)-2,2-propane, bis(2-hydroxynaphthyl)methane, 1,5-hydroxynaphthalene or the like. Also, polyepoxides similarly produced from epichlorohydrin and novolak-type phenol resins may be employed.

Further illustrating the polyepoxides are acrylic polymers containing epoxy groups. Preferably, these acrylic polymers are polymers formed by copolymerizing an alpha, beta-ethylenically unsaturated epoxy-containing monomer, such as, for example, glycidyl acrylate or methacrylate with other copolymerizable alpha, beta-ethylenically unsaturated monomers. Any polymerizable monomeric compound containing at least one $CH_2=C<$ group, preferably in terminal position, may be polymerized with the unsaturated glycidyl compounds. Examples of such monomers include:

(1) monoolefinic and diolefinic hydrocarbons;
(2) halogenated monoolefinic and diolefinic hydrocarbons;

(3) esters of organic and inorganic ethylenically unsaturated acids or the esters thereof;

(4) organic nitriles.

The acrylic polymers and their method of preparation are known in the art. Examples thereof are disclosed in U.S. Pat. No. 3,928,156, column 4, line 40, through column 6, line 68, which is herein incorporated by reference.

The tannic acid is a member of a class of compounds known as tannins. The tannins are known in the art and their source is also known. As a matter of convenience, a brief characterization of the tannins is provided hereinbelow. The tannins are generally classified as hydrolyzed or condensed tannins. They are extracted from plants and are generally named to correspond with the source of extraction, for example, tannin derived from an oak tree is named oak tannin. A detailed and apt description of the tannins is provided by Kirk-Othmer, *Encylopedia of Chemical Technology,* (1954), Vol. 13, pages 578–599, which is incorporated herein by reference. It is envisaged that other tannins would be useful in the present invention. Presently, however, tannic acid is used in this invention and is disclosed, accordingly, as preferred.

In preparing the epoxy-tannin reaction product, the tannin is reacted with the epoxy material in an amount sufficient to produce an ungelled epoxy-tannin reaction product. Typically, the tannin is reacted with polyepoxides in an amount ranging from 0.5 to 4.4, and preferably 1.0 to 2.0 percent by weight, based on the total weight of the tannin and the polyepoxide. As would be realized, the amount in which the tannin is reacted with the epoxy material would vary from the afore-stated amount, in instances when monoepoxides are reacted therewith, preferably in conjunction with the polyepoxides.

The reaction conditions for the preparation of the novel compositions are as follows. Catalysts such as phosphonium salts, for example, ethyl triphenyl phosphonium acetate, ethyl triphenyl phosphonium iodide and tetrabutyl phosphonium acetate are usually present in the preparation of the novel composition of the present invention. The amount of catalyst ranges from about 0.1 to about 2 percent based on total weight of the reactants. A solvent is not necessary in this reaction even though one is often used in order to afford better control of the reaction. Preferably, the reaction is conducted over the temperature range of 100° to 160° C. for about 1 to 4 hours; the time and temperature, of course, depend on one another and on the specific reactants, catalysts and other reaction conditions.

Aqueous dispersions or solutions of the reaction products of the invention can be prepared by dispersing in water, the novel compositions of the invention which are water-dispersible. The novel compositions can be made water-dispersible with a water-solubilizing group such as a cationic group. The water-dispersible composition can be prepared by incorporating a cationic group, preferably a cationic salt or its precursor, by reacting it with the novel composition. An alternate method of preparing the water-dispersible composition comprises reacting the cationic group or its precursor, the epoxy material and the tannin, in a so-called "one shot" process. The cationic group is present in the novel composition in an amount sufficient to render the resulting composition dispersible in water, and electrophoretic.

Typically, the cationic group is an onium salt, which is preferred, or an amine salt. Illustrative of the onium salts are ammonium salts, which are preferred herein. Generally, the ammonium salts are prepared by reacting the novel composition with an ammonium salt precursor which is, for instance, a tertiary amine salt. An illustrative example of the ammonium salt precursor is dimethylethanolamine lactate. U.S. Pat. Nos. 3,962,165; 3,894,922 and 3,959,106, which are, hereby, incorporated by reference, more fully describe the onium salts as to their nature and method of preparation.

The amine salts can be salts of ammonia, primary amine, secondary amine and tertiary amine. The amine salts can be incorporated into the novel composition by reacting the novel compositions with ammonia, primary or secondary amine, followed by at least partially acid-neutralizing the resulting amine adduct. Examples of amines useful herein are mono- or dialkylamine such as ethylamine, diethylamine; hydroxyalkylamine such as diethanolamine. Examples of acids which are useful in neutralizing the amines are lactic acid, acetic acid and phosphoric acid.

In the practice of this invention, the concentration of the ungelled reaction product in the dispersion could vary depending on the desired efficacy of the pretreatment and, of course, on application methods and conditions such as time and temperature. Generally, the concentration is such that the treating composition would impart effective corrosion resistance properties to substrates treated therewith.

At the lower concentration limit, the dispersion can contain from about 1 to 25 percent by weight of the reaction product, the percentage by weight being based on the total weight of the dispersion.

At the end of the process steps of this invention, the metal article is removed from the electrophoretic composition and dried or cured. Metal substrates treated with the compositions of this invention have been found to display excellent corrosion resistance properties. Substrates which have been cured by baking after they have been treated, in the manner of the present invention, display a more improved corrosion resistance. They can be exposed to the atmosphere without danger of atmospheric oxidation on the surface. After drying or curing, the metal substrates are, generally, coated with decorative or protective coatings. The process of this invention has been found to be particularly useful for cold rolled steel and galvanized steel.

This and other aspects of the invention are further illustrated by the following examples. It is to be understood that the following examples and other aspects of the invention described herein are not intended to be limiting; rather, other equivalents of the invention are intended to be covered as well.

EXAMPLE IA

This example illustrates the preparation of the novel composition of the present invention, and the quaternary ammonium salt derivative thereof. The following charge was used in the preparation:

| Ingredients | Parts by Weight (Grams) |
| --- | --- |
| EPON 1001* | 1500 |
| Tannic acid | 20 |
| 2-ethylhexanol | 156 |
| Ethyltriphenyl phosphonium acetate (70% in methanol) | 10.8 |
| Dimethylethanolamine lactate | 251.1 |

-continued

| Ingredients | Parts by Weight (Grams) |
|---|---|
| (75% in deionized water) | |
| Deionized water | 54 |
| Deionized water | 858.6 |

*EPON 1001 is a polyglycidyl ether of bisphenol A having an epoxy equivalent of about 500 and a molecular weight of about 1000, commercially available from Shell Chemical Company.

The EPON 1001 was charged to a properly equipped reaction vessel and heated to 145° C. There was then introduced into the reaction vessel all the tannic acid. The resulting mixture was heated until it became homogeneous. At 151° C., the ethyltriphenyl phosphonium acetate was added, dropwise, to the mixture. There resulted an exotherm with the temperature rising to 158° C. Thereafter, the mixture was heated to 160° C. and the 2-ethylhexanol was added, dropwise. About an hour after the commencement of the addition of the 2-ethylhexanol, at 135° C., with the heating means turned off, the dimethylethanolamine lactate in the first portion of water was slowly added, dropwise, over a period of an hour, to the mixture. About an hour thereafter, and over a temperature range of 95° to 100° C., the second portion of water was added to thin the mixture.

There was then obtained a water-dispersed quaternized epoxy-tannin reaction product having a resin solids content of 60 percent and epoxy value of infinity.

EXAMPLE IB

This example illustrates the process of this invention, wherein the sequential anodic and cathodic electrophoretic steps are employed to provide improved pretreatment of substrates.

An electrophoretic composition having a resin solids content of 9.4 percent was prepared by thinning the resinous composition of Example IA, with deionized water.

Panels of galvanized steel were pretreated with the electrophoretic composition, in the following manner: a panel of the substrate, serving as an anode, and cathode, were immersed in the instant electrophoretic composition. A low voltage was impressed across the electrodes, with the passage of current for a brief period of time. (The panel remains electroconductive.) Thereafter, the polarity of electrodes was reversed. A low voltage was applied across the electrode for a brief period of time. The exact voltage and time of passage of current are reported in Table I, below.

The pretreated panel was then removed from the electrophoretic composition, rinsed, cathodically electrocoated with a primer (comprising an acid-solubilized amino group-containing epoxy resin, available from PPG Industries, Inc.) at 150 volts for 90 seconds, and then baked at a temperature of 350° F. (177° C.) for 20 minutes.

To evaluate the efficacy of the instant pretreatment process, the baked films were scribed with an "X" mark and then subjected to a corrosion resistance test in a salt spray chamber of 5 percent by weight aqueous sodium chloride, in 100 percent relative humidity atmosphere, at 38° C.

For the purpose of comparison, there were evaluated control panels, as well. The control panels comprised substrates that were either untreated or pretreated in a manner that was different from that of the instant invention. The control panels were, also, cathodically electrocoated with the above PPG proprietary resin, at 150 volts for 90 seconds, baked at 350° F. (177° C.) for 20 minutes, scribed with an "X" mark and then subjected to a corrosion resistance test, as described above. Table I, below, reports the results of the evaluation.

TABLE I

| | | Pretreatment Conditions | | | | Corrosion Resistance Evaluation |
| | | Anodic Electrophoresis | | Cathodic Electrophoresis | | |
| Substrate | Pretreatment Composition | Voltage (volts) | Time (sec.) | Voltage (volts) | Time (sec.) | by Scribe Creepage After 2 Weeks |
|---|---|---|---|---|---|---|
| Galvanized steel | Quaternary epoxy resinous composition comprising tannic acid | 10 | 10 | 50 | 10 | 2 mm |
| Galvanized steel | Quaternary epoxy resinous composition comprising tannic acid | 25 | 10 | 50 | 10 | 5-6 mm |
| Galvanized steel | Quaternary epoxy resinous composition comprising tannic acid | | | 50 | 10 | 5-6 mm |
| Galvanized steel | Untreated (Control) | | | | | total delamination |
| Galvanized steel | Zinc phosphate treatment (Control) | | | | | 3-4 mm |
| Galvanized Steel | Zinc phosphate treatment + Chromic acid rinse (Control) | | | | | 2-3 mm |

We claim:
1. A process for preparing a corrosion-resistant metallic substrate; said process comprises steps of:
  (i) passing an electric current between the substrate, acting as an anode, and a cathode, in contact with an electrophoretic composition; followed by
  (ii) passing an electric current between the substrate, acting as a cathode, and an anode, in contact with the electrophoretic composition;
  the electrophoretic composition comprises an aqueous dispersion of a composition of matter containing a cationic salt and an ungelled reaction product of:
  (a) an epoxy material;
  (b) a tannin.

2. A process of claim 1, wherein the epoxy material is selected from the group consisting of epoxy-containing polyethers, epoxy-containing polyesters, epoxy-containing polyurethanes and epoxy-containing acrylics.

3. A process of claim 2, wherein the epoxy material is a polyepoxide.

4. A process of claim 3, wherein the tannin is present in an amount ranging from about 0.5 to 4.4 percent by weight, based on the total weight of the tannin and the polyepoxide.

5. A process of claim 4, wherein the tannin is present in an amount ranging from 1.0 to 2.0 percent by weight, based on the total weight of the tannin and the polyepoxide.

6. A process of claim 1, wherein the tannin is tannic acid.

7. A process of claim 1, wherein the substrate is of a cold rolled steel or a galvanized steel.

8. A process, as recited in claim 1, further comprising coating the substrate with a decorative or protective coating.

9. A metallic substrate which is prepared by the process of claim 1 or claim 8.

10. A metallic substrate prepared as recited in claim 9 which is a ferrous metal.

* * * * *